(12) United States Patent
Coulson et al.

(10) Patent No.: US 7,489,731 B2
(45) Date of Patent: Feb. 10, 2009

(54) COMMUNICATION SYSTEM USING OFDM (75) Inventors: Alan James Coulson, Waterloo (NZ); Chaturanga Pilans Lokuge, Tawa (NZ); Derek Bernard Richardson, Belmont (NZ)

(73) Assignee: Industrial Research Limited, Parnell, Auckland (NZ)

( * ) Notice: Subject to any disclaimer, the term of this patent is extended or adjusted under 35 U.S.C. 154(b) by 942 days.

(21) Appl. No.: 10/373,427

(22) Filed: Feb. 24, 2003

(65) Prior Publication Data
US 2003/0156534 A1 Aug. 21, 2003

Related U.S. Application Data (63) Continuation of application No. PCT/NZ01/00173, filed on Aug. 24, 2001.

(30) Foreign Application Priority Data
Aug. 25, 2000 (NZ) .................................... 506558

(51) Int. Cl.
*H04K 1/10* (2006.01)
(52) U.S. Cl. ..................... 375/260; 370/206; 370/208; 375/285
(58) Field of Classification Search ................ 370/206, 370/208, 350, 465; 375/141, 260, 285; 386/46
See application file for complete search history.

(56) References Cited

U.S. PATENT DOCUMENTS

| | | | |
|---|---|---|---|
| 5,282,222 A | 1/1994 | Fattouche et al. | |
| 5,313,169 A | 5/1994 | Fouche et al. | |
| 5,555,268 A * | 9/1996 | Fattouche et al. | ........... 375/141 |
| 5,818,845 A | 10/1998 | Moura et al. | |

(Continued)

FOREIGN PATENT DOCUMENTS

AU 666411 2/1996

(Continued)

OTHER PUBLICATIONS

Matheus et al; Optimal design of a multicarrier systems with soft impulse shaping including equalization in time or frequency direction; IEEE Globecom 1997; Nov. 3-8, 1997; pp. 310-314.*

(Continued)

*Primary Examiner*—Kevin M Burd
*Assistant Examiner*—Adolf Dsouza
(74) *Attorney, Agent, or Firm*—Thomas R. Vigil (57) ABSTRACT

The OFDM communications system for wireless networks includes at least one transmitter and at least one receiver. Each transmitter includes a signal source, a transmit modulator that arranges the data into packets and appends a pilot symbol of a repeated pseudo random binary sequence to the start of each packet, a multiplexer, an inverse fast Fourier transform, an up-sampler, a digital low pass filter, a digital to analogue converter, and an RF module. Each receiver includes an RF module, an analogue to digital converter, a digital low pass filter, a down-sampler, a frame detector to search for significant pilot symbol correlations and make initial estimates of at least one signal parameter, a digital phase locked loop to remove estimated frequency- and phase-offsets, a fast Fourier transform operator, a linear phase corrector to remove estimated sub-sample timing errors, a decision block, and a demultiplexer.

23 Claims, 6 Drawing Sheets

U.S. PATENT DOCUMENTS

| | | | |
|---|---|---|---|
| 5,914,933 A * | 6/1999 | Cimini et al. | 370/208 |
| 6,058,101 A | 5/2000 | Huang et al. | |
| 6,084,871 A | 7/2000 | Engstrom et al. | |
| 6,192,068 B1 | 2/2001 | Fattouche et al. | |

FOREIGN PATENT DOCUMENTS

| | | |
|---|---|---|
| CA | 2064975 | 9/1993 |
| GB | 2346520 | 8/2000 |
| JP | 11284597 | 10/1999 |
| JP | 2000 11 5087 | 4/2000 |
| WO | WO 98/10546 | 3/1998 |
| WO | WO98/32268 | 7/1998 |
| WO | WO99/65180 | 12/1999 |
| WO | WO 00/44120 | 7/2000 |
| WO | WO 00/65710 | 11/2000 |
| WO | WO 00/65792 | 11/2000 |

OTHER PUBLICATIONS

Anikhindi et al; A commercial DVB-T demodulator chipset; INtrnational Broadcasting Convention; Sep. 12-16, 1997; pp. 528-533.*

Mochizuki et al; A high performance frequency and timing synchronization technique for OFDM; IEEE Globecom 1998; Nov. 8-12, 1998; pp. 3443-3448.*

Principles of modulation and channel coding for digital broadcasting for mobile receivers, A lard. M, Lassalle. R, EBU Review-Technical, pp. 168-190, No. 224, Aug. 1987.

Orthogonal frequency division multiplexing for wireless channels, Cimini. L, Li. Y, AT&T Labs-Research, IEEE Globecom 98.

OFDM for data communication over mobile radio FM channels—Part I: Analysis and experimental results, Casas. E, Leung. C, IEEE Transactions on Communications, vol. 39, No. 5, May 1991.

Analysis and simulation of a digital mobile channel using orthogonal frequency division multiplexing, Cimini. L, IEEE Transactions on Communications, vol. com-33, No. 7, Jul. 1985.

Conference proceedings. WPMC '00. Third International Symposium on Wireless Personal Multimedia Communications, Bangkok, Thailand, Nov. 12-15, 2000, "Performance Of Channel Estimation Using Pilot Symbols For Coherent Ofdm System" Van Duc Nguyen, Hansen C, Kuchenbecker HP. Refer to the abstract and the introduction.

* cited by examiner

COMMUNICATION SYSTEM USING OFDM

CROSS REFERENCE TO RELATED APPLICATIONS

This application is a continuation of PCT/NZ01/00173, filed Aug. 24, 2001 which claims priority from New Zealand application No. 506558, filed Aug. 25, 2000.

BACKGROUND OF THE INVENTION

1. Field of Invention

The present invention relates to a method and system for communication over wireless local area networks using orthogonal frequency division multiplexing.

2. Description of the Prior Art

Future wireless local area networks (WLANs) will use orthogonal frequency division multiplexing (OFDM) as the modulation method. OFDM is well suited to the requirements of localised, broadband communications and has been shown to operate at raw data rates of 40 Mbit/s in demonstration conditions.

When a signal passes through a channel to a receiver, distortions due to the channel are introduced to the signal. As well as the channel-induced distortions, frequency differences in the transmitter and receiver RF local oscillators and sample clocks due to component tolerances introduce, respectively, frequency and timing errors. Each of the time varying frequency, phase and timing errors and the packet start require estimation by the receiver. A number of methods of estimating these parameters in OFDM systems have previously been proposed. Methods have been proposed based on pilot symbols and based on null symbols. Assuming that initial synchronisation has been achieved, methods to track these parameters from OFDM data have also been previously proposed. Alternative tracking and/or adaptive channel estimation methods have been proposed which are based on embedded pilot tones. A disadvantage of the currently proposed systems with currently proposed pilot symbols, null symbols and cyclic prefixes is the overhead needed to obtain initial estimates of and track the time varying time, frequency and phase errors.

BRIEF SUMMARY OF THE INVENTION

It is the object of the present invention to provide an OFDM communications system with a pseudo random binary sequence pilot symbol or to at least provide the public with a useful choice.

According to the present invention there is provided an OFDM communications system for wireless networks comprising at least one transmitter and at least one receiver; each transmitter including, a signal source arranged to provide data, a transmit modulator arranged to arrange the data into data packets and append a pilot symbol comprising a repeated pseudo random binary sequence to the start of each data packet, a multiplexer arranged to convert the data packets from serial data to parallel data, an inverse fast Fourier transform operator arranged to convert the multiplexed data from the frequency domain to the time domain, an up-sampler arranged to sample the time domain data at a rate greater than the nominal data rate, a digital low pass filter arranged to remove out-of-band noise from the sampled data, a digital to analogue converter arranged to convert digital data to analogue data, and an RF module arranged to modulate an RF carrier with the transformed data thereby transforming the data to a higher frequency band for transmission, each receiver including, an RF module arranged to demodulate an RF carrier from the received signal thereby transforming the data to a lower frequency band, an analogue to digital converter arranged to convert analogue data to digital data and further arranged to sample the data at a rate greater than the nominal data rate, a digital low pass filter arranged to remove out-of-band noise, a down-sampler (decimator) arranged to reduce the sample rate to the nominal data rate, a frame detector arranged to search for significant pilot symbol correlations within the digital data stream and make initial estimates of at least one signal parameter, a digital phase locked loop arranged to remove estimated frequency- and phase-offsets from the low pass signal, a fast Fourier transform operator arranged to transform the data outputted from the phase locked-loop from the time domain to the frequency domain, a linear phase corrector arranged to remove estimated sub-sample timing errors from the Fourier transformed data stream, a decision block arranged to decide to which allowable data point each bit in the transformed data is assigned to produce noise free data, and a demultiplexer arranged to convert the noise free data from parallel data to serial data, and wherein the pilot symbol is a repeated pseudo random binary sequence.

According to the present invention there is also provided an OFDM communications system for wireless networks comprising at least one transmitter and at least one receiver; each transmitter including, a signal source arranged to provide data, a transmit modulator arranged to arrange the data into data packets and append a pilot symbol comprising a pseudo random binary sequence to the start of each data packet, a multiplexer arranged to convert the data packets from serial data to parallel data, an inverse fast Fourier transform operator arranged to convert the multiplexed data from the frequency domain to the time domain, a digital to analogue converter arranged to convert digital data to analogue data, and an RF module arranged to modulate an RF carrier with the transformed data thereby transforming the data to a higher frequency band for transmission, each receiver including, an RF module arranged to demodulate an RF carrier from the received signal thereby transforming the data to a lower frequency band, an analogue to digital converter arranged to convert analogue data to digital data, a frame detector arranged to search for significant pilot symbol correlations within the digital data stream and make initial estimates of at least one signal parameter, a digital phase locked loop arranged to remove estimated frequency- and phase- offsets from the low pass signal, a fast Fourier transform operator arranged to transform the data outputted from the phase locked-loop from the time domain to the frequency domain, a decision block arranged to decide to which allowable data point each bit in the transformed data is assigned to produce noise free data, and a demultiplexer arranged to convert the noise free data from parallel data to serial data, and wherein the pilot symbol is a repeated pseudo random binary sequence.

According to the present invention there is also provided a transmitter for an OFDM communications system including; a signal source arranged to provide data, a transmit modulator arranged to arrange the data into data packets and append a pilot symbol comprising a repeated pseudo random binary sequence to the start of each data packet, a multiplexer arranged to convert the data packets from serial data to parallel data, a Fourier transform operator arranged to convert the multiplexed data from the frequency domain to the time domain, a digital to analogue converter arranged to convert digital data to analogue data, and an RF module arranged to modulate an RF carrier with the transformed data thereby transforming the data to a higher frequency band for transmission.

According to the present invention there is also provided a receiver for an OFDM communications system including, an RF module arranged to demodulate an RF carrier from the received signal thereby transforming the data to a lower frequency band, an analogue to digital converter arranged to convert analogue data to digital data, a frame detector arranged to search for significant pilot symbol correlations within the digital data stream and make initial estimates of at least one signal parameter, a digital phase locked loop arranged to remove estimated frequency- and phase-offsets from the low pass signal, a Fourier transform operator arranged to transform the data outputted from the phase locked-loop from the time domain to the frequency domain, a decision block arranged to decide to which allowable data point each bit in the transformed data is assigned to produce noise free data, and a demultiplexer arranged to convert the noise free data from parallel data to serial data.

Preferably the signal source in each transmitter provides binary data.

Preferably each transmitter further includes an encoder arranged to encode data from the data source into a form that includes some error detection and/or correction capabilities. Ideally the encoder is a Reed-Solomon encoder. Preferably the transmit modulator arranges the encoded data into data packets and appends a pilot symbol to the start of each data packet.

Preferably each receiver further includes a decoder arranged to decode the serial noise free data outputted from the demultiplexer. Ideally the decoder further corrects and/or detects errors in the decoded data up to the limit of the decoder. If the encoder is a Reed-Solomon encoder then the decoder is a Reed-Solomon decoder.

Preferably the signal parameters estimated by the frame detector of each receiver include the start of packet, time-varying frequency offset and time-varying phase offset.

Preferably each transmitter further includes a modulator arranged to modulate the data into a modulation scheme. Ideally the modulator is part of the transmit modulator.

Preferably the RF module of each transmitter includes a quadrature modulator, frequency up-converter, bandpass filter and power amplifier.

Preferably each receiver further includes a demodulator arranged to demodulate the data into binary data. Ideally the demodulator is part of the decision block.

Preferably the RF module of each receiver includes a low noise amplifier, bandpass filter, quadrature demodulator and frequency down-converter.

Preferably each transmitter further includes a pre-distortion equaliser arranged to compensate for non-ideal composite analogue filter amplitude and phase responses in the transmitter and receiver RF sections. Alternatively the pre-distortion equaliser is additionally arranged to compensate for channel effects.

According to the present invention there is also provided a method of communicating over wireless network using an OFDM communication system comprising the steps of; in each transmitter, providing a stream of data, arranging the data into packets, appending a pilot symbol comprising a repeated pseudo random binary sequence to the start of each data packet, multiplexing the packets to convert the data from serial to parallel, performing an inverse fast Fourier transform on the data to convert the multiplexed data from the frequency domain to the time domain, sampling the data at a rate greater than the nominal data rate, digitally low pass filtering the data, converting the data from digital data to analogue data, and using the data to modulate an RF carrier thereby frequency shifting the data to a higher frequency band for transmission, in each receiver, demodulating an RF carrier from the received data thereby shifting the data to baseband, converting the demodulated analogue signal into a stream of digital data at an oversampled data rate, digitally low pass filtering the digital data to remove out of band noise, down-sampling (decimating) the filtered data to the nominal sample rate, detecting the start of a packet of the down-sampled data by searching for significant correlations with the pilot symbol within the data stream, making an estimate of at least one signal parameter, removing the estimated frequency-offset and phase-offset using a digital phase locked loop, transforming the data using a fast Fourier transform from time domain data to frequency domain data, removing the estimated sub-sample timing offset from the transformed data using a linear phase shifter, assigning each bit of the transformed data to an allowable data point to produce noise free data, and demultiplexing the noise free data from parallel data to serial data.

According to the present invention there is also provided a method of communicating over wireless network using an OFDM communication system comprising the steps of; in each transmitter, providing the transmitter with a stream of data, arranging the data into packets, appending a pilot symbol comprising a repeated pseudo random binary sequence to the start of each data packet, multiplexing the packets to convert the data from serial to parallel, performing an inverse fast Fourier transform on the data to convert the multiplexed data from the frequency domain to the time domain, converting the data from digital data to analogue data, and using the data to modulate an RF carrier thereby frequency shifting the data to a higher frequency band for transmission, in each receiver, demodulating an RF carrier from the received data thereby shifting the data to baseband, converting the demodulated analogue signal into a stream of digital data, detecting the start of a packet of the down-sampled data by searching for significant correlations with the pilot symbol within the data stream, making an estimate of at least one signal parameter, removing the estimated frequency-offset and phase-offset using a digital phase locked loop, transforming the data using a fast Fourier transform from time domain data to frequency domain data, assigning each bit of the transformed data to an allowable data point to produce noise free data, and demultiplexing the noise free data from parallel data to serial data.

According to the present invention there is also provided a method of transmitting data over a wireless network using an OFDM communication system comprising the steps of; providing the transmitter with a stream of data, arranging the data into packets, appending a pilot symbol comprising a repeated pseudo random binary sequence to the start of each data packet, multiplexing the packets to convert the data from serial to parallel, performing an inverse fast Fourier transform on the data to convert the multiplexed data from the frequency domain to the time domain, converting the data from digital data to analogue data, and using the data to modulate an RF carrier thereby frequency shifting the data to a higher frequency band for transmission.

According to the present invention there is provided a method of receiving data over a wireless network using an OFDM communication system comprising the steps of; demodulating an RF carrier from the received data thereby shifting the data to baseband, converting the demodulated analogue signal into a stream of digital data, detecting the start of a packet of the down-sampled data by searching for significant correlations with the pilot symbol within the data stream, making an estimate of at least one signal parameter, removing the estimated frequency-offset and phase-offset using a digital phase locked loop, transforming the data using a fast Fourier transform from time domain data to frequency domain data, assigning each bit of the transformed data to an allowable data point to produce noise free data, and demultiplexing the noise free data from parallel data to serial data.

Preferably the signal source in each transmitter provides binary data.

Preferably each transmitter further includes the step of encoding data from the data source into a form that includes some error detection and/or correction capabilities. Preferably the transmit modulator further includes the step of arranging the encoded data into data packets and appending a pilot symbol to the start of each data packet.

Preferably each receiver further includes the step of decoding the serial noise free data outputted from the demultiplexer. Ideally the decoding section includes the steps of correcting and/or detecting errors in the decoded data up to the limit of the decoder.

Preferably the frame detector of each receiver further includes the steps of estimating the start of packet, time-varying frequency offset and time-varying phase offset.

Preferably each transmitter further includes the step of modulating the data into a modulation scheme.

Preferably each receiver further includes the step of demodulating the data into binary data. Ideally the step of demodulating the data is part of the step of assigning each data bit to an allowable data point.

Preferably each transmitter further includes the step of compensating for known composite analogue filter induced amplitude and phase distortion.

BRIEF DESCRIPTION OF THE SEVERAL VIEWS OF THE DRAWINGS

A preferred form system and method of the invention will be further described with reference to the accompanying figures by way of example only and without intending to be limiting, wherein.

DETAILED DESCRIPTION OF THE INVENTION

To provide error-free communication it is necessary for any radio receiver to estimate channel- and system-induced distortions. The wide-sense stationary uncorrelated scatterers (WSS-US) model of the low pass-equivalent multipath fading channel is the time-varying impulse response $$c(\tau; t) = \sum_{m=1}^{M(t)} a_m(t) e^{j\phi_m(t)} \delta[\tau - \tau_m(t)] \quad (1)$$

which is a function of time-delay $\tau$ and time t; where $a_m(t)$ is the amplitude, $\phi_m(t) = 2\pi f_c \tau_m(t)$ is the phase for carrier frequency $f_c$, and $\tau_m(t)$ is the time-delay of the mth of M bins or echoes measured at time t. For a narrowband signal, that is one for which the signal bandwidth B is less than the channel coherence bandwidth $(\Delta f)_c$, the "flat" fading multipath channel reduces to $$c(t) \doteq c(0; t) \quad (2)$$
$$= a(t) e^{j\phi(t)} \delta[\tau - \tau_0(t)]$$

where a(t) is the amplitude, $\phi(t)$ is the phase and $\tau_0(t)$ is the excess delay imposed by the multiplicative channel. Note that all of the above quantities are time-varying.

In addition to the channel-induced distortions, frequency differences in the transmitter and receiver RF local oscillators and sample clocks due to component tolerances introduce, respectively, frequency and timing errors. Thus, for a narrowband channel (ie one in which the channel may be described by equation (2) above), the received sampled signal may be expressed as $$s^\delta(t) = \sum_{n=0}^{N-1} s(t) a(t) e^{j[2\pi v(t) + \theta(t)]} \delta[t - nT - \tau_s(t)] \quad (3)$$

where v(t) is the frequency-, $\theta(t)$ is the phase- and $\tau_s(t)$ is the time-error induced by the combination of channel and system distortions, n is the index of N samples of received signal s(t) at sample period T and the superscript $\delta$ denotes a sampled signal. The time-varying frequency error v(t) is a composite of Doppler shift and RF local oscillator offset, the time-varying phase error $\theta(t)$ is the instantaneous snapshot of these composite frequency errors, the time-varying time-error $\tau_s(t)$ is a composite of the excess delay and sample clock phase offset, and n=0 represents the start-of-packet sample. Each of these parameters requires estimation by the receiver and, since all but n are time-varying quantities, each estimate must be updated through the reception process.

The OFDM system described here uses a synchronisation method with a single pilot symbol based on a (repeated) pseudo random binary sequence. The pilot symbol is used to obtain initial estimates of parameters n, v(0), $\theta(0)$ and $\tau(0)$ and subsequent OFDM data is used to track v(nT), $\theta(nT)$ and $\tau(nT)$. An advantage of this method is that it requires less overhead than previously reported methods, as it requires only a single pilot symbol and relies on neither null symbols, pilot tones nor cyclic prefixes to obtain or track parameters.

Further, since the pilot symbol is a (frequency domain) pseudo random binary sequence which is coherently demodulated, the parameter estimates are maximum likelihood and the pilot symbol also may be used as an initial channel estimate both for frequency flat and frequency-selective fading channels.

Figure 1:
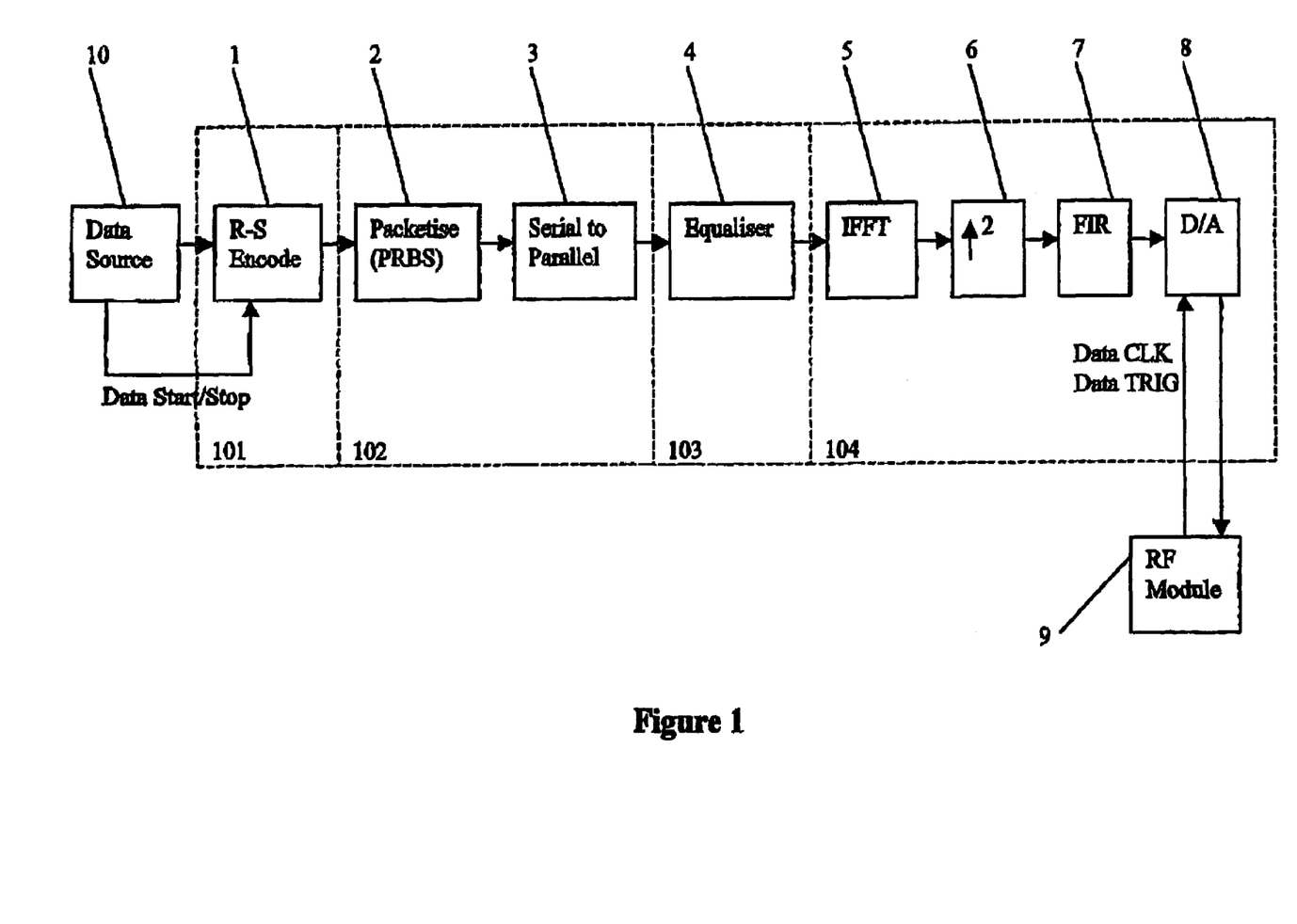
FIG. 1 is a block diagram of a transmitter of the OFDM communication system of the invention.
Figure 2:
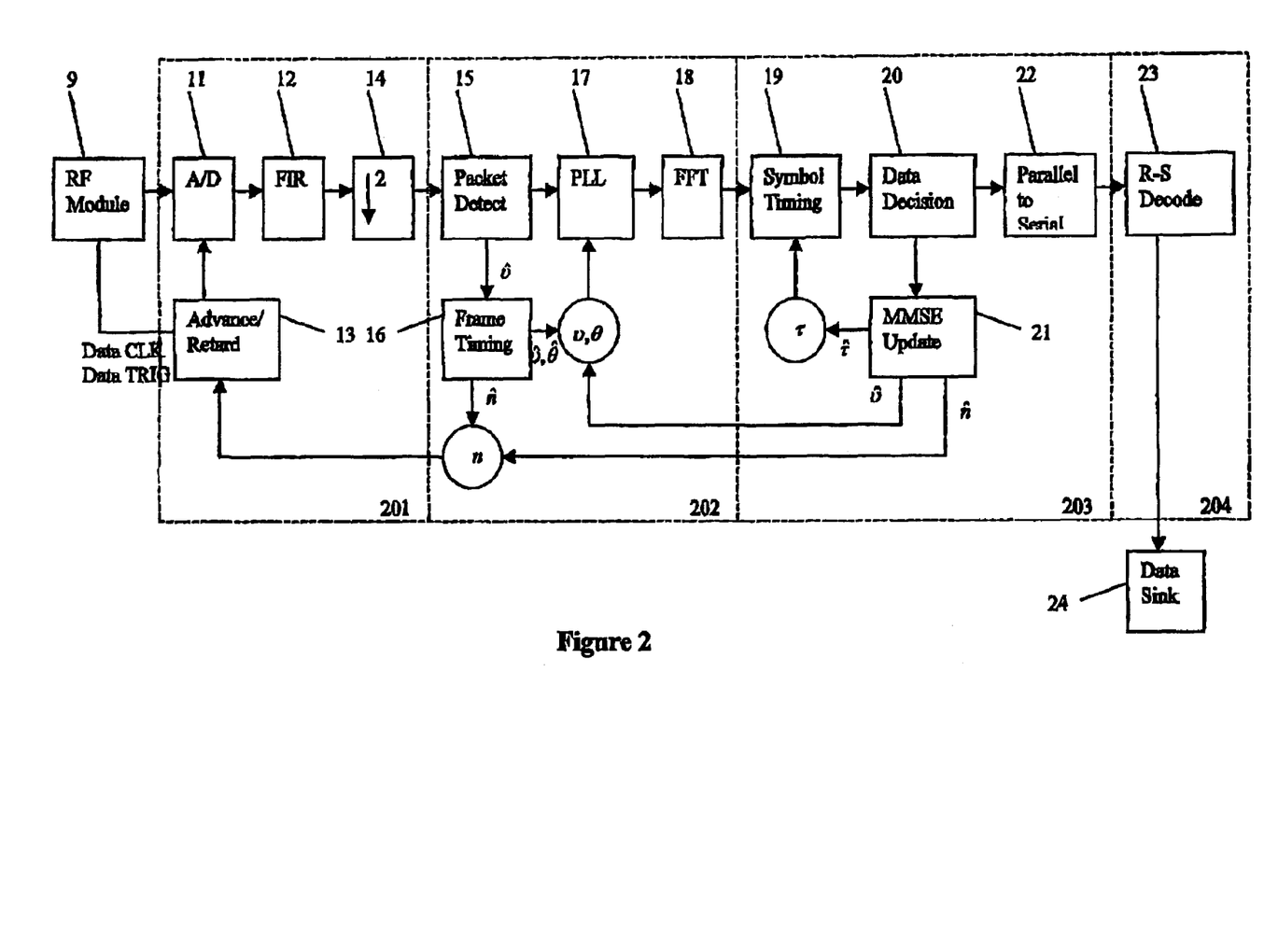
FIG. 2 is a block diagram of a receiver of the OFDM communication system of the invention.

FIGS. 1 and 2 are block diagrams of the transmitter and receiver. An example of parameters that may be used in this system is shown in Table 1. These parameters are by way of example only and should not be seen as limiting. The parameters may be varied without going beyond the scope of the invention. The example system with these parameters was used to generate the results shown in FIGS. 3A to 6B to demonstrate the invention.

TABLE 1

Key parameters of an example system.

| Parameter | Value |
|---|---|
| OFDM Block Size | 128 |
| Number of Sub-Carriers | 100 |
| Modulation | QPSK |
| Coding | Reed-Solomon (15, 11) |
| Sample Rate | 1 MHz |
| RF Carrier | 2.45 GHz |
| Sub-Carrier Spacing | 7.812 kHz |
| −3 dB Bandwidth | 785 kHz |
| Symbol Duration | 128 μs |
| Coded Data Rate QPSK | 1.56 Mbit/s |
| Uncoded Data Rate QPSK | 1.15 Mbit/s |

In the example system both the transmitter and receiver modules were implemented using a number of digital signal processors (DSPs), each running at 40 MIPS. At the symbol sample rate of 1 MHz, this restricted each processor to a maximum of 40 instruction cycles per symbol. The processor boards were connected, as analogue complex baseband, through an interface module to the RF up- and down-converters. As only single channel A/D and D/A conversion was available for the processor boards, the in-phase and quadrature samples were digitally multiplexed into (out of) the A/D (D/A) converter at double the symbol sample rate. Further, the complex baseband was up-sampled (down-sampled) by two into (out of) the A/D (D/A) converter and low-pass filtered digitally to ease the analogue transmitter and receiver filter requirements.

However other equipment may be used to produce an OFDM communications system of the invention. The invention should not be viewed as limited to use of any particular electronics or DSP.

The baseband transmitter, shown in FIG. 1, can be viewed as consisting of four modules. Module 101 contains encoder 1 such as a Reed-Solomon encoder, module 102 contains a transmit modulator 2 and framer 3, module 103 contains a pre-distortion equaliser 4, and module 104 contains an OFDM inverse fast Fourier transformer (IFFT) 5 plus signal conditioner 6, 7 and D/A converter driver 8.

Each of these modules may be implemented using relatively standard technology. The functions of each block have been grouped into larger modules for convenience only.

Data source 10 provides raw data to encoder 1. The data is ideally binary. If data is provided to the data source in another form then preferably the data source converts the data to binary data. In use the data source will be connected to a piece of electronic equipment (such as a laptop computer or wireless phone) that provides data to the data source. In some cases the data source module may be the electronic equipment itself or a link to the electronic equipment. The data source may also communicate to encoder 1 to begin or cease encoding data using the Data Start/Stop arrow illustrated in FIG. 1.

Encoder 1 then encodes the data to add error detection and/or correction information to the raw data. In FIG. 1 the encoder is shown as a Reed-Solomon encoder. However the encoder may be any BCH encoder or other suitable encoder. A Reed-Solomon encoder has the advantage of encoding, and thereby protecting from error, blocks of data bits. This provides frequency domain data with good protection from frequency-selective fading, which will tend to induce bit errors in blocks of data bits. The encoder is arranged to segment the data received from data source 10 into segments with a pre-determined number of bits. When a cyclic coder (like a Reed-Solomon coder) is used the number of data bits in each segment depends on the actual code used. For each segment the coder performs the code. In the case of a cyclic encoder this includes adding error detection and/or correction information to the end of the code. The coded data segments are then passed to transmit modulator 2.

Transmit modulator 2 arranges the coded data segments into packets and appends a pilot symbol to the start of each packet. Each data packet includes at least one coded data segment. If an encoder is not used then the transmit modulator receives data directly from data source 10 and arranges the data into packets before appending the pilot symbol to the start of each packet. The pilot symbol is a repeated pseudo random binary sequence. The pilot symbol is used in the receiver, firstly, to identify the packet start, secondly, to produce an initial estimate of the time-varying channel parameters described previously and, thirdly, to "sound" the channel to produce an initial estimate of the frequency-selective fading channel for the pre-distortion equaliser 4. Transmit modulator 2 may be further arranged to pad each packet to a predetermined length. In general only the last packet in a data sequence will need padding as all other packets will have been segmented to the required length by the encoder. Alternatively the encoder may be arranged to pad short sequences to the required length before encoding data. The transmit modulator may also be arranged to take the coded data and transfer it to a modulation scheme such as QPSK or 64 QAM. Other suitable modulation types may also be used.

Framer 3 takes the packets provided by transmit modulator 2 and multiplexes the data from serial data to parallel data. There may be less parallel data paths from framer 3 then there are data bits in a packet. Ideally the number of data bits in each packet is an integer multiple of the number of parallel paths from the framer. The transmit modulator 2 and framer 3 may be implemented using finite state machine architecture.

The data from framer 3 then passes to equaliser 4. It has been shown that the signal bandwidth in a typical indoor propagation environment in some instances is sufficiently narrow to experience frequency flat fading. Equaliser 4 is a pre-distortion equaliser arranged to compensate for non-ideal composite analogue filter amplitude and phase responses in the transmitter and receiver RF sections. Use of pre-distortion equaliser 4 ensures that the composite transmit/receiver filter is linear phase. Alternatively in addition the pre-distortion equaliser may be arranged to equalise the channel. In this case if the receiver and transmitter are coupled together as a transceiver then when data is received the pilot symbol of each data packet is used (among other things) to "sound" the channel. The results of "sounding" the channel are used to produce an initial estimate of the frequency selective fading channel for the pre-distortion equaliser. The channel estimate may be updated with each received packet. Exploiting inherent OFDM processing efficiency, the equaliser implementation is made computationally efficient by operating directly in the frequency domain. Thus, the number of complex multiplies (say 100) per OFDM block required to implement the frequency domain equaliser produces equivalent performance to a time-domain tap equaliser with the same number of taps (100).

Following the pre-distortion equaliser is inverse fast Fourier transform (IFFT) operator 5. The IFFT operator receives parallel data in the frequency domain and transforms it into time domain data. The time domain data then passes to up-sampler 6 that samples that data at greater than the nominal bit rate. The use of the up-sampler reduces the performance requirement for the output stage digital low pass filter 7. Typically data is sampled at twice the nominal bit rate but other rates of over sampling could be used. Together with FIR filter 7 the up-sampler makes up a signal conditioner arranged to reduce the performance requirements for the output stage digital low pass filter and subsequent analogue filter. Ideally the FIR filter 7 is arranged as a low pass filter and is arranged to remove out-of-band noise from the data.

Finally the equalised time domain data is converted from digital data to analogue data in digital to analogue (D/A) converter 8 and modulated onto a carrier wave in a higher frequency band for transmission in RF module 9. The data is then transmitted. Ideally RF block 9 includes a quadrature modulator, frequency up-converter, bandpass filter and power amplifier.

The baseband receiver, shown in FIG. 2, consists of four modules. Module 201 contains an A/D converter driver 11, 13 and signal conditioner 12, 14, module 202 contains a frame detector 15, 16 and first stage receiver 17, 18, module 203 contains a second stage receiver including symbol timing 19 and decision making 20 means, and module 204 contains a decoder 23.

The data received by RF block 9 which is arranged to shift the data back to baseband. Ideally the RF block of the receiver includes a low noise amplifier, bandpass filter, quadrature demodulator and frequency down-converter. The baseband data is then sampled by analogue to digital (A/D) converter 11. This converts the received data from an analogue signal to a digital signal. Ideally the A/D converter samples the received data at greater than the nominal bit rate. The sampled signal then passes through signal conditioner 12, 14 that compensates for some of the channel and noise induced distortions. A further purpose of the signal conditioner 12 is to digitally low pass filter the baseband signal to remove out-of-band noise. Down-sampler 14 samples the data at the nominal bit rate. The data is then passed to packet detector 15.

The data received by packet detector 15 may be described by the equation $$r^\delta(t) = \sum_n r(t)\exp^{j[2\pi vt+\theta]}\delta(t-nT-\tau) \quad (5)$$

where r(t) is the convolution of the message data, channel and the signal conditioner 12, 14, v is the time-varying frequency error, θ is the time varying phase error and τ is the time-varying time error.

Packet detector 15 and frame timing block 16 search for significant pilot symbol correlations in the received data. The packet detect block also provides the frame timing block 16 with an estimate of the time-varying frequency error. When a pilot symbol is detected the frame detector 15, 16 then makes initial estimates of n, v(0) and θ(0) and initialises or updates the local oscillator compensation phase locked loop (PLL) 17.

Frame timing module 16 is further arranged to provide a start of packet estimate to timing correction block 13. Along with a start of packet estimate provided by MMSE update block 21, the timing correction block advances or retards sampling by the A/D converter by a fraction of a sample as required. For example if the A/D converter samples the received and down-converted data at twice the nominal bit rate then timing correction block 13 may advance or retard the A/D converter by half a sample. During the remainder of frame reception, module 202 is the first stage of the OFDM receiver, applying the compensation PLL 17 and performing the forward FFT 18 required by OFDM demodulation.

After the start of a packet has been detected by packet detect block 15 the packet is passed through phase locked loop 17. Phase locked loop 17 also receives estimate of the time varying phase error and the time varying frequency error. The phase locked loop uses the time varying phase and frequency error estimates to remove the time varying phase and frequency errors from the data packets.

The corrected data packets then pass through forward fast Fourier transform operator 18 which transforms the data from time domain data to frequency domain data.

Following transformation the frequency domain data passes into the second stage receiver. The second stage receiver commences operation on frame detection. Its functions are, initially, to estimate the time varying sub-sample time offset τ(0) using MMSE block 21 and, throughout the remainder of the frame, to apply symbol timing error correction using symbol timing block 19 and update estimates of the time varying phase error θ(n), and thereby the time varying frequency error v(n), and the time varying time error τ(n) using minimum mean square error (MMSE) estimation. Note that, since the symbol timing error is bounded by definition, that is $$-\frac{1}{2} < \tau \le \frac{1}{2},$$

when this range is exceeded, an increment or decrement to the current sample number n is required. Incrementing or decrementing the current sample number of a function performed by timing correction block 13. Data decision block 20 follows symbol timing block 19. Data decision block 20 makes hard decisions on each data bit (symbol) prior to error detection and correction.

Data decision block 20 may include a demodulator. Acting together with the decision process, the demodulator converts the data back from a modulation scheme, such as QPSK or 64 QAM, to binary data.

After hard decisions have been made on the data the data streams are converted back from parallel to serial data by demultiplexer 22.

Following demultiplexer 22 is decoder 23. The decoder decodes the coded data and performs error corrections and/or detection up to the limit of the decoder. The decoder is matched to encoder 1 of the transmitter of FIG. 1. For example if the encoder is a Reed-Solomon encoder then the decoder will be a Reed-Solomon decoder. Following decoding of the data the data is then passed to the electronic equipment attached to the receiver as data sink 24.

Although the receiver and transmitter of the OFDM communication system have been described separately it is expected that devices using the OFDM communication system to communicate over a wireless LAN will contain both a transmitter and a receiver. These may be implemented together in a transceiver.

Example outputs of the receiver modules are shown in FIGS. 3 to 6. All data in these examples were BPSK encoded for clarity, and operate at a coded bit rate of 0.78 Mbit/s. A typical operating condition for the example system is QPSK encoding at a coded bit rate of 1.56 Mbit/s.

Figure 3A:
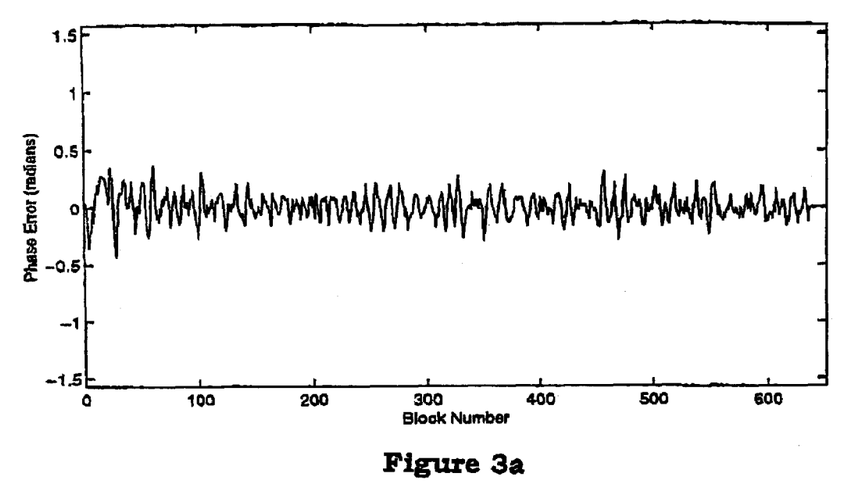
FIG. 3A is a plot showing the phase error against the block number for an example system using a receiver of the invention.
Figure 3B:
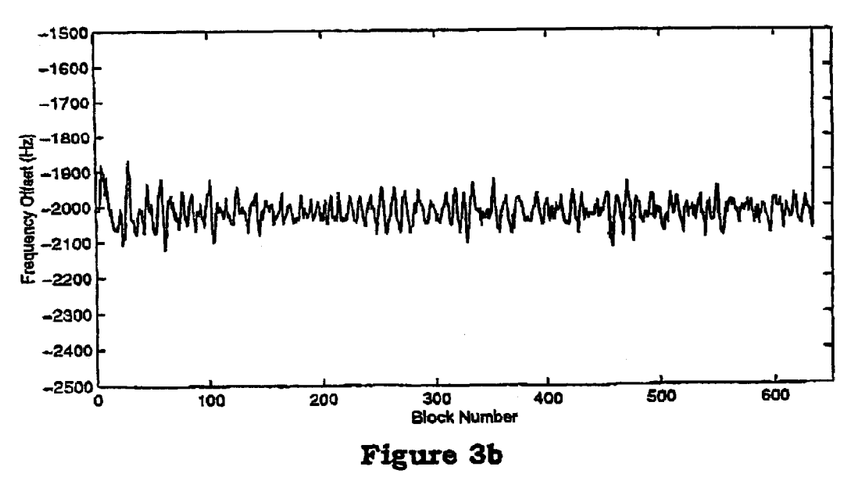
FIG. 3B is a plot showing the frequency offset against the block number for an example system using a receiver of the invention.

FIGS. 3A and 3B show the effect of the RF local oscillator error estimation and PLL correction module. FIG. 3A depicts the estimated time-varying phase error per OFDM block, whereas FIG. 3B expresses the same quantity relative to the RF local oscillator frequency offset estimate to produce a per OFDM block estimate of local oscillator frequency error. The slighter larger than average excursions at the start of the frame shows the operation of the PLL loop filter, which compensates for the time lag between estimation and correction due to the software partitioning between DSPs and the data transfer latency between the two receiver modules. This output shows that the phase error estimate is consistent and zero mean, implying that the module has correctly locked onto the frequency error.

Figure 4:
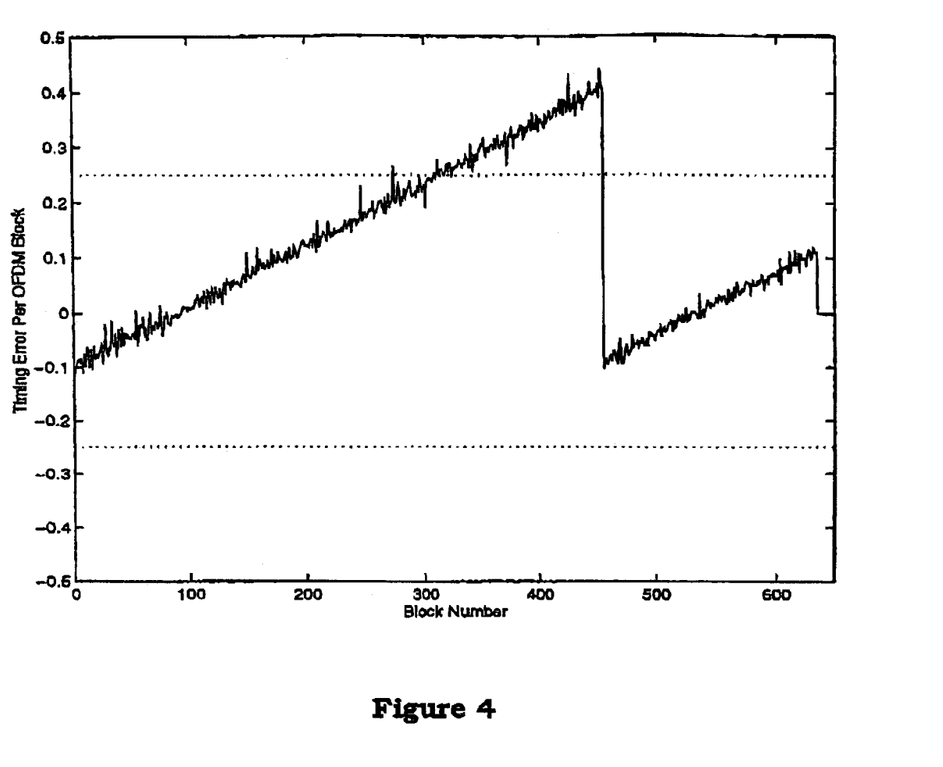
FIG. 4 is a plot showing the symbol timing error estimation and correction for an example system using a receiver of the invention.

FIG. 4 depicts the operation of the symbol timing error estimation and correction block 19 (in FIG. 2). The timing error is expressed as a fraction of the symbol period, and can be seen to vary linearly with OFDM block number over time. This is due to the constant frequency difference between transmit and receive sample clocks. The error can be seen to be zero mean around the linear progression, implying that the module has correctly estimated and corrected the symbol timing error. The error "step" occurring around OFDM block number 450 results from the error approaching the maximum allowed value of half a symbol period, and the receiver acting to prevent this threshold from being exceeded by incrementing the received sample number by one half. This is possible because of the over-sampling by two (in the example system) at the A/D converter. The sample number increment by one half results in the "step" in timing error of negative one half which is seen in FIG. 4. The dotted lines in FIG. 4 indicate the desired range of symbol timing error, and the overshoot of the top of this range evident in this example is due to hysteresis to prevent multiple sample number increment/decrement events due to noise.

Figure 5A:
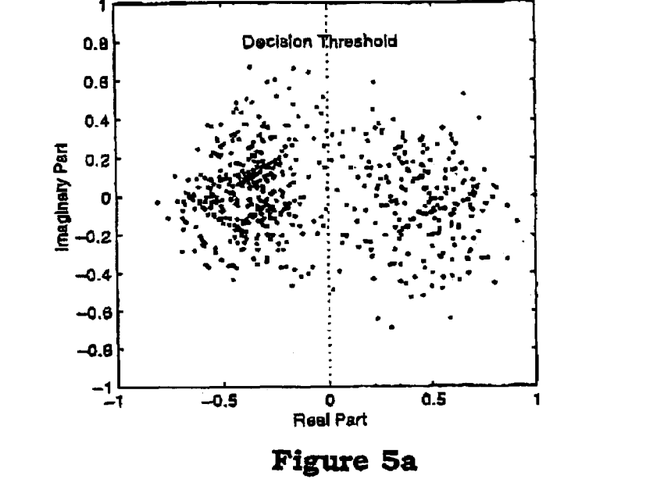
FIG. 5A is a plot showing the low SNR data received by the receiver before processing of the data by an example system using a receiver of the invention.
Figure 5B:
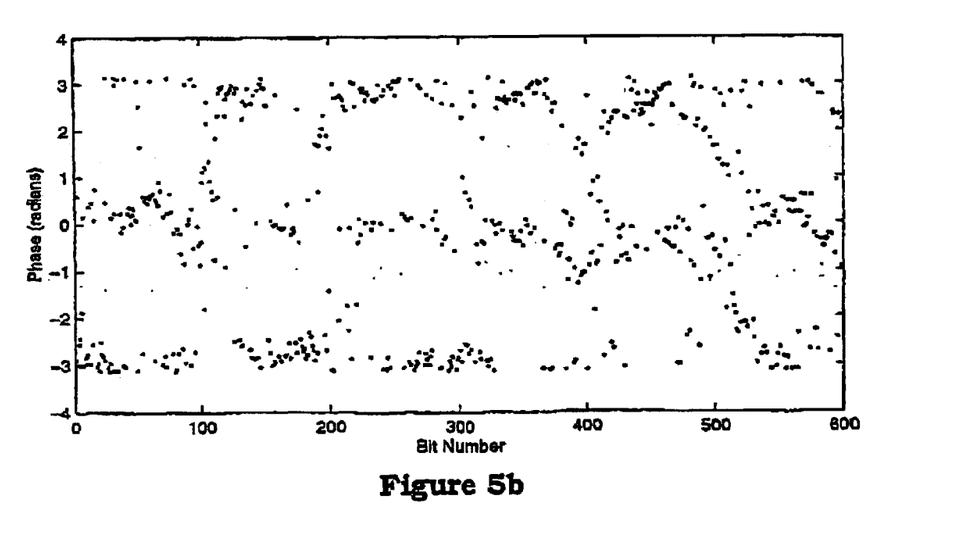
FIG. 5B is a plot showing the phase of the low SNR data of FIG. 5A received by the receiver before processing of the data by an example system using a receiver of the invention.

FIGS. 5A and 5B depict the data complex phase plane, FIG. 5A, and data phase time sequence, FIG. 5B, for the OFDM frame for which receiver module operations are shown in FIGS. 3A, 3B and 4. The data in this experimental example was BPSK encoded for clarity. It can be seen that the received signal SNR is low for this example, and was estimated as about 10 dB. This results in a few bit errors evidenced by data points crossing the decision threshold depicted in FIG. 5A. Also visible in FIG. 5B is phase distortion, which was produced by non-linear phase characteristics in the transmit-receive composite analogue filter chain. This occurred in this experimental example because the pre-distortion equaliser was not enabled, thus demonstrating the severity of this problem in the example system. Despite the low received signal SNR and phase distortions, the channel parameter estimation and correction algorithms are functioning correctly in FIGS. 3A, 3B and 4. This demonstrates the robustness of these algorithms.

Figure 6A:
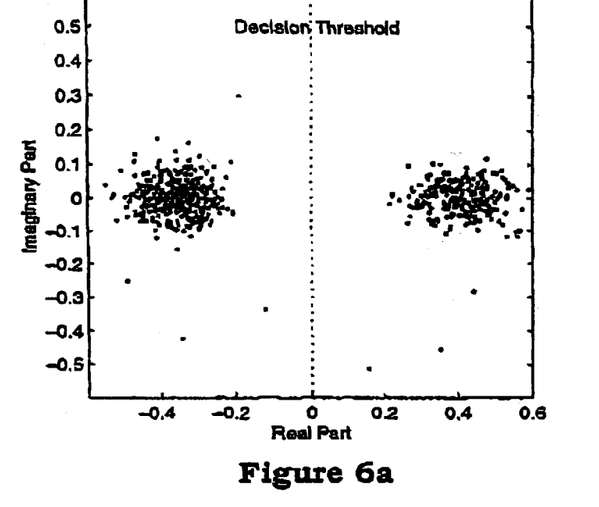
FIG. 6A is a plot showing the moderate SNR data received by the receiver before processing of the data by an example system using a receiver of the invention.
Figure 6B:
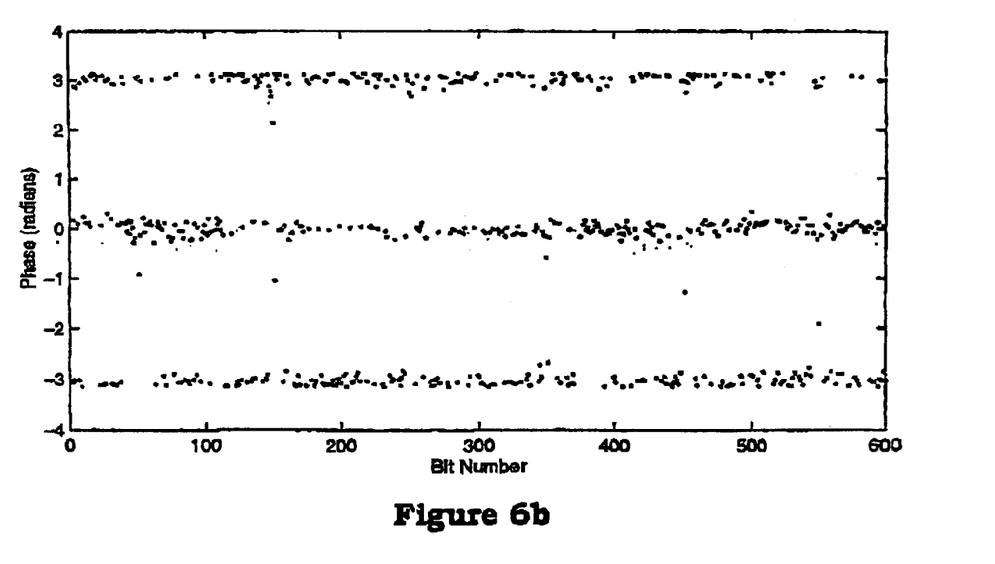
FIG. 6B is a plot showing the phase of the moderate SNR data of FIG. 5A received by the receiver before processing of the data by an example system using a receiver of the invention.

FIGS. 6A and 6B depict the data complex phase plane, FIG. 6A, and data phase time sequence, FIG. 6B, for a more typical OFDM frame. Again, the data was BPSK encoded for clarity. It can be seen that the received signal SNR is significantly higher, and was estimated as about 20 dB, which is sufficient to support low bit error rate QPSK encoded data. It can be seen in FIG. 6A that there are a few data points that deviate significantly from the main clusters of data constellation. By examining FIG. 6B, it can be seen that these "deviant" data points occur at regular time intervals, and are due to an AC coupling between RF output and A/D converter input causing a large signal attenuation in the DC frequency bin. Errors caused by this phenomenon are corrected in the Reed-Solomon decoder. By comparing FIG. 6B with FIG. 5B, it can be seen that the received signal exhibits little phase distortion in this example compared with the previous example: this is due to the pre-distortion equaliser being enabled. This demonstrates that pre-distortion equalisation significantly reduces the effect of non-linear phase characteristics in the transmit-receive composite analogue filter chain.

It has been shown that the key channel impairments of frequency and timing error are robustly estimated and corrected by the invention, resulting in reliable communication, albeit at a reduced data rate, down to 10 dB received signal SNR. These results indicate that the system, under good operating conditions, can operate at peak coded data rates of up to 4.69 Mbit/s, using 64-QAM encoding, without increasing the sample rate or processor speed.

The foregoing describes the invention including a preferred form thereof. Alterations and modifications as will be obvious to those skilled in the art are intended to be incorporated within the scope hereof as defined by the accompanying claims.

We claim:

1. A method of communicating over a wireless network using OFDM communication system comprising the steps of:
   in each transmitter,
   providing a stream of data,
   arranging the data into packets,
   appending a pilot symbol comprising a repeated pseudo random binary sequence to the start of each data packet,
   multiplexing the packets to convert the data from serial to parallel,
   performing an inverse fast Fourier transform on the data to convert the multiplexed data from the frequency domain to the time domain,
   sampling the data at a rate greater than the nominal data rate,
   digitally low pass filtering the data,
   converting the data from the digital data to analogue data, and
   using the data to modulate an RF carrier thereby frequency shifting the data to a higher frequency band for transmission,
   in each receiver,
   demodulating an RF carrier from the received data thereby shifting the date to baseband,
   converting the demodulated analogue signal into a stream of digital data at an oversampled data rate,
   digitally low pass filtering the digital data to remove out of band noise,
   down-sampling (decimating) the filtered data to the nominal sample rate,
   detecting the start packet of the down-sampled data by searching for significant correlations within the pilot symbol within the data stream,
   making an estimate of at least one signal parameter, removing the estimated frequency-offset and phase-offset using a digital phase locked loop,
   transforming the data using a fast Fourier transform from time domain data to frequency domain data, removing the estimated sub-sample timing offset from the transformed data using a linear phase shifter, assigning each bit of the transformed data to an allowable data point to produce noise free data, and demultiplexing the noise free data from parallel data to serial data.

2. A method of communicating over a wireless network using an OFDM communication system as claimed in claim 1 further including the step of in each transmitter encoding data from the data source into a form that includes some error detection and/or correction capabilities.

3. A method of communicating over a wireless network using an OFDM communication system as claimed in claim 2 further including the step of in each transmitter arranging the encoded data into data packets and appending a pilot symbol to the start of each data packet.

4. A method of communicating over a wireless network using an OFDM communication system as claimed in claim 2 further including the step of in each receiver decoding the serial noise free data outputted from the demultiplexer.

5. A method of communicating over a wireless network using an OFDM communication system as claimed in claim 1 further including the steps of an in the frame detector of each receiver estimating the start of packet, time-varying frequency offset and time-varying phase offset of the received data.

6. A method of communicating over a wireless network using an OFDM communication system as claimed in claim 1 including the step of in each transmitter modulating the data into a modulation scheme.

7. A method of communicating over a wireless network using an OFDM communication system as claimed in claim 6 including the step of demodulating the data into data bits and assigning each data bit to an allowable data point.

8. A method of communicating over a wireless network using an OFDM communication system as claimed in claim 1 further including the step of in each transmitter compensating for known composite analogue filter induced amplitude and phase distortion.

9. A method of communicating over a wireless network using an OFDM communication system comprising the steps of:

in each transmitter, providing a stream of data, arranging the data into packets, appending a pilot symbol comprising a repeated pseudo random binary sequence to the start of each data packet, multiplexing the packets to convert the data from serial to parallel, performing an inverse fast Fourier transform on the data to convert the multiplexed data from the frequency domain to the time domain, converting the data from the digital data to analogue data, and using the data to modulate an RF carrier thereby frequency shifting the data to a higher frequency band for transmission, in each receiver, demodulating an RF carrier from the received data thereby shifting the data to baseband, converting the demodulated analogue signal into a stream of digital data, detecting the start packet of the down-sampled data by searching for significant correlations with the pilot symbol within the data stream, making an estimate of at least one signal parameter, removing the estimated frequency-offset and phase-offset using a digital phase locked loop, transforming the data using a fast Fourier transform from time domain data to frequency domain data, assigning each bit of the transformed data to an allowable data point to produce noise free data, and demultiplexing the noise free data from parallel data to serial data.

10. A method of communicating over a wireless network using an OFDM communication system as claimed in claim 9 further including the step of in each transmitter encoding data from the data source into a form that includes some error detection and/or correction capabilities.

11. A method of communicating over a wireless network using an OFDM communication system as claimed in claim 10 further including the step of in each transmitter arranging the encoded data into data packets and appending a pilot symbol to the start of each data packet.

12. A method of communicating over a wireless network using an OFDM communication system as claimed in claim 10 further including the step of in each receiver decoding the serial noise free data outputted from the demultiplexer.

13. A method of communicating over a wireless network using an OFDM communication system as claimed in claim 9 further including the steps of in the frame detector of each receiver estimating the start of packet, time-varying frequency offset and time-varying phase offset of the received data.

14. A method of communicating over a wireless network using an OFDM communication system as claimed in claim 9 further including the step of in each transmitter modulating the data into a modulation scheme.

15. A method of communicating over a wireless network using an OFDM communication system as claimed in claim 14 including the steps of demodulating the data into data bits and assigning each data bit to an allowable data point.

16. A method of communicating over a wireless network using an OFDM communication system as claimed in claim 9 further including the step of in each transmitter compensating for know composite analogue filter induced amplitude and phase distortion.

17. A method of communicating over a wireless network using an OFDM communication system as claimed in claim 9 further including the step of in each transmitter sampling the inverse fast Fourier transformed data at greater than the nominal bit rate.

18. A method of communicating over a wireless network using an OFDM communication system as claimed in claim 9 further including the step of in each transmitter low pass filtering the inverse fast Fourier transformed data.

19. A method of communicating over a wireless network using an OFDM communication system as claimed in claim 9 further including the step of in each receiver converting the demodulated analogue signal into a stream of data digital at an oversampled data rate.

20. A method of communicating over a wireless network using an OFDM communication system as claimed in claim 19 further including the step of in each receiver down-sampling (decimating) the data to the nominal sample rate.

21. A method of communicating over a wireless network using an OFDM communication system as claimed in claim 9 further including the step of in each receiver removing the estimated sub-sample timing offset from the transformed data using a linear phase shifter.

22. An OFDM communication system for wireless networks including at least one transmitter and at least one receiver:
  each transmitter including,
  a signal source to provide data,
  a transmit modulator arranged to arrange the data into data packets and append a pilot symbol to the start of each data packet,
  a multiplexer to convert the data packets from serial data to parallel data,
  an inverse fast Fourier transform operator arranged to convert the multiplexed data from the frequency domain to the time domain,
  an up-sampler arranged to sample the time domain data a rate greater than the nominal data rate,
  a digital low pass filter arranged to remove out-of-band noise from the sampled data,
  a digital to analogue converter arranged to convert digital data to analogue data,
  and an RF module arranged to modulate an RF carrier with the transformed data thereby transforming the data to a higher frequency band for transmission,
  each receiver including,
  an RF module arranged to demodulate an RF carrier from the received signal thereby transforming the data to a lower frequency band,
  an analogue to digital converter arranged to convert analogue data to digital data and further arranged to sample the data at a rate greater than the nominal data rate,
  a digital low pass filter arranged to remove out-of-band noise,
  a down-sampler (decimator) arranged to reduce the sample rate to the nominal data rate,
  a frame detector arranged to search for significant pilot symbol correlations within the digital data stream and make initial estimates of at least one signal parameter,
  a digital phase locked loop arranged to remove estimated frequency- and phase-offsets from the low pass signal,
  a fast Fourier transform operator arranged to transform the data outputted from the phase looked-loop from the time domain to the frequency domain,
  a linear phase corrector arranged to remove estimated sub-sample timing errors from the Fourier transformed data stream,
  a decision block arranged to decide which allowable data point each bit in the transformed data is assigned to produce noise free data, and
  a demultiplexer arranged to covert the noise free data from parallel to serial data, and
  wherein the pilot symbol is repeated pseudo random binary sequence.

23. An OFDM communication system for wireless networks including at least one transmitter and at least one receiver:
  each transmitter including,
  a signal source to provide data,
  a transmit modulator arranged to arrange the data into data packets and append a pilot symbol comprising a repeated pseudo random binary sequence to the start of each data packet,
  a multiplexer arranged to convert the data packets from serial data to parallel data,
  an Fourier transform operator arranged to convert the multiplexed data from the frequency domain to the time domain,
  a digital to analogue converter arranged to convert digital data to analogue data,
  and an RF module arranged to modulate an RF carrier with the transformed data thereby transforming the data to a higher frequency band for transmission,
  each receiver including,
  an RF module arranged to demodulate an RF carder from the received signal thereby transforming the data to a lower frequency band,
  an analogue to digital converter arranged to convert analogue data to digital data,
  a frame detector arranged to search for significant pilot symbol correlations within the digital data stream and make initial estimates of at least one signal parameter,
  a digital phase locked loop arranged to remove estimated frequency- and phase-offsets from the low pass signal,
  a Fourier transform operator arranged to transform the data outputted from the phase locked-loop from the time domain to the frequency domain,
  a decision block arranged to decide which allowable data point each bit in the transformed data is assigned to produce noise free data, and
  a demultiplexer arranged to covert the noise free data from parallel to serial data.

* * * * *

UNITED STATES PATENT AND TRADEMARK OFFICE
CERTIFICATE OF CORRECTION

PATENT NO. : 7,489,731 B2 Page 1 of 1
APPLICATION NO. : 10/373427
DATED : February 10, 2009
INVENTOR(S) : Alan James Coulson, Chaturanga Pilane Lokuge and Derek Bernard Richardson It is certified that error appears in the above-identified patent and that said Letters Patent is hereby corrected as shown below:

On the Title Page item [75] inventors:

Change: "Chaturanga Pilans Lokuge"

to: --Chaturanga Pilane Lokuge--

Signed and Sealed this

Thirteenth Day of October, 2009

David J. Kappos
*Director of the United States Patent and Trademark Office*